US011298746B2

(12) United States Patent
Shibayama et al.

(10) Patent No.: US 11,298,746 B2
(45) Date of Patent: Apr. 12, 2022

(54) METAL POWDER PRODUCING APPARATUS AND GAS JET DEVICE FOR SAME

(71) Applicant: MITSUBISHI POWER, LTD., Yokohama (JP)

(72) Inventors: Takashi Shibayama, Yokohama (JP); Shinya Imano, Yokohama (JP); Yuting Wang, Yokohama (JP); Shigenobu Eguchi, Yokohama (JP)

(73) Assignee: MITSUBISHI POWER, LTD., Yokohama (JP)

( * ) Notice: Subject to any disclaimer, the term of this patent is extended or adjusted under 35 U.S.C. 154(b) by 129 days.

(21) Appl. No.: 16/719,008

(22) Filed: Dec. 18, 2019

(65) Prior Publication Data

US 2020/0246874 A1    Aug. 6, 2020

(30) Foreign Application Priority Data

Feb. 4, 2019  (JP) .............................. JP2019-018040

(51) Int. Cl.
*B22F 9/08*    (2006.01)

(52) U.S. Cl.
CPC ........ *B22F 9/082* (2013.01); *B22F 2009/088* (2013.01)

(58) Field of Classification Search
CPC .... B22F 9/082; B22F 9/10; B22F 2009/0832; B22F 2009/088; B22F 2009/0892; B22F 2999/00
USPC .......................................................... 425/7
See application file for complete search history.

(56) References Cited

U.S. PATENT DOCUMENTS

| 3,309,733 A | * | 3/1967 | Winstrom ............... | B22F 9/082 425/7 |
| 3,588,951 A | * | 6/1971 | Hegmann ............... | B22F 9/082 425/7 |
| 3,663,206 A | * | 5/1972 | Lubanska ............... | B22F 9/082 75/337 |

(Continued)

FOREIGN PATENT DOCUMENTS

| CN | 105618773 A | 6/2016 |
| CN | 106513692 A | 3/2017 |

(Continued)

OTHER PUBLICATIONS

Korean Office Action dated Nov. 13, 2020 for Korean Patent Application No. 10-2019-0167737.

(Continued)

*Primary Examiner* — Seyed Masoud Malekzadeh
(74) *Attorney, Agent, or Firm* — Volpe Koenig

(57) ABSTRACT

The metal powder producing apparatus includes: a first gas jet nozzle that includes jet holes disposed in a bottom surface of a gas jet device so as to form first rings each, and jets gas against molten metal flowing down through the liquid nozzles; a second gas jet nozzle that includes jet holes disposed in the bottom surface of the gas jet device so as to form second rings each on an outer side of a corresponding one of the first rings, and jets gas to prevent scatter of metal particles; and a third gas jet nozzle that includes jet holes disposed in the bottom surface of the gas jet device so as to form a third ring on an outer side of the second gas jet nozzle, and jets gas against an inner wall surface of the spray chamber.

4 Claims, 4 Drawing Sheets

(56) References Cited

U.S. PATENT DOCUMENTS

| | | | | |
|---|---|---|---|---|
| 4,025,249 A * | 5/1977 | King | .................... | B22F 9/082 |
| | | | | 425/6 |
| 4,272,463 A * | 6/1981 | Clark | .................... | B22F 9/082 |
| | | | | 75/337 |
| 4,284,394 A * | 8/1981 | Thompson | ............ | B22F 9/082 |
| | | | | 425/8 |
| 4,787,935 A * | 11/1988 | Eylon | .................... | B22F 9/08 |
| | | | | 425/7 |
| 4,869,469 A * | 9/1989 | Eylon | .................... | B22F 9/08 |
| | | | | 266/202 |
| 7,514,145 B2 * | 4/2009 | Akioka | ............... | G03G 9/0804 |
| | | | | 428/402 |
| 2016/0279712 A1 * | 9/2016 | Ha | ........................ | B22F 9/082 |
| 2017/0239731 A1 * | 8/2017 | Kaneta | ................. | B22F 9/082 |
| 2018/0147625 A1 | 5/2018 | Takahashi et al. | | |
| 2019/0198208 A1 * | 6/2019 | Zakotnik | ............. | B22F 1/0018 |

FOREIGN PATENT DOCUMENTS

| | | | | |
|---|---|---|---|---|
| DE | 3811077 A1 * | 10/1989 | ............ | B22F 9/082 |
| GB | 1413651 A | 11/1975 | | |
| JP | 62-192506 A | 8/1987 | | |
| JP | 63-230806 A | 9/1988 | | |
| JP | 06-049512 A | 2/1994 | | |
| JP | 06-029446 B4 | 4/1994 | | |
| JP | 2000-273506 A | 10/2000 | | |
| JP | 2016-211027 A | 12/2016 | | |
| WO | 2015/030456 A1 | 3/2015 | | |
| WO | 2015/114838 A1 | 8/2015 | | |
| WO | 2017/022595 A1 | 2/2017 | | |
| WO | 2018/035205 A1 | 2/2018 | | |

OTHER PUBLICATIONS

Extended European Search Report dated Apr. 14, 2020 for the European Patent Application No. 19217416.7.

Japanese Office Action dated Aug. 17, 2021 for Japanese Patent Application No. 2019-018040.

* cited by examiner

METAL POWDER PRODUCING APPARATUS AND GAS JET DEVICE FOR SAME

BACKGROUND OF THE INVENTION

1. Field of the Invention

The present invention relates to a metal powder producing apparatus producing particulate metal (metal powder) by causing a high-pressure gas fluid to collide with molten metal flowing down from a liquid nozzle, and a gas jet device for the metal powder producing apparatus.

2. Description of the Related Art

Examples of a method for producing particulate metal (metal powder) from molten metal include atomization including gas atomization and water atomization. The gas atomization involves causing a liquid to flow down from a liquid nozzle provided at a lower portion of a melting chamber in which molten metal is stored and blowing, against the liquid, an inert gas from a plurality of gas jet nozzles disposed around the liquid nozzle. A flow of the molten metal from the liquid nozzle is split into a large number of fine metal droplets by inert gas flows from the gas jet nozzles, and the metal droplets fall down through a spray chamber and are solidified while being spheroidized by surface tension. Thus, spherical grains of metal powder are collected in a hopper at a bottom portion of the spray chamber.

For example, JP-2016-211027-A discloses a metal powder producing apparatus including: a crucible provided at an upper portion of a spray chamber and holding a metal liquid, an atomize nozzle (a liquid nozzle) connected to a bottom portion of the crucible and causing the metal liquid to fall into the spray chamber while blowing the inert gas against the metal liquid; a plurality of inert gas nozzles (gas jet nozzles) provided around the atomize nozzle and blowing a high-pressure inert gas against the metal liquid flowing down through the atomize nozzle to form the metal liquid into a large number of fine metal droplets; a gas inlet and a gas outlet causing the gas in the spray chamber to be replaced with another gas; and a second gas inlet providing a gas for setting the atmosphere inside the spray chamber to be an oxidizing atmosphere and/or a nitriding atmosphere.

In recent years, there has been an increasing need for metal powder having a smaller particle size than metal powder previously required for the atomization, for example, as a material for metal three-dimensional printers accumulating a large amount of metal particles to form metal with a desired shape. The known metal powder used for powder metallurgy, welding, and the like has a particle size of, for example, approximately 70 to 100 μm. However, the metal powder used for three-dimensional printers has a very small particle size of, for example, approximately 20 to 50 μm.

In this regard, a "spray nozzle" is a generic term used to refer to a liquid nozzle and a gas jet nozzle including a plurality of jet holes formed around the liquid nozzle and jetting gas from the plurality of jet holes to pulverize a liquid flowing down from the liquid nozzle. A possible measure for efficiently producing fine metal powder without any change in the shape of the known spray chamber is to provide a plurality of spray nozzles for one spray chamber, otherwise one spray nozzle is provided for one spray chamber.

However, thus providing a plurality of spray nozzles may bring metal particles resulting from pulverization by the spray nozzles into contact with one another before the metal particles are solidified, increasing the particle size of each metal particle. Thus, the yield of metal particles having the desired particle size may decrease. Additionally, providing the plurality of spray nozzles makes a distance from each spray nozzle (liquid nozzle) to an inner wall of the spray chamber shorter than in the related art. Accordingly, unsolidified metal particles may come into contact with or stick to the inner wall of the spray chamber, and the yield is likely to decrease. Furthermore, in a case where the metal particle sticks to or accumulates on the inner wall of the spray chamber to degrade heat radiation performance of the spray chamber, the metal powder sticks to or accumulates in the hopper without being sufficiently cooled in the spray chamber. This may reduce the yield.

An object of the present invention is to provide a metal powder producing apparatus capable of efficiently producing meal powder without any change the shape of the spray chamber and a gas jet device for the metal powder producing apparatus.

SUMMARY OF THE INVENTION

The present invention includes a plurality of aspects for solving the above-described problem. An example of the aspects includes a metal powder producing apparatus including: a spray chamber; a plurality of liquid nozzles causing molten metal stored in a crucible to flow down into the spray chamber; a gas jet device provided with a plurality of liquid nozzle insertion holes into each of which respective of the plurality of liquid nozzles are inserted; a first gas jet nozzle including a plurality of jet holes disposed in a bottom surface of the gas jet device in such a manner as to form first rings each around a corresponding one of the plurality of liquid nozzle insertion holes, the first gas jet nozzle jetting gas against molten metal flowing down from the liquid nozzles to pulverize the molten metal; a second gas jet nozzle including a plurality of jet holes disposed in the bottom surface of the gas jet device in such a manner as to form second rings each on an outer side of a corresponding one of the first rings, the second gas jet nozzle jetting gas to prevent scatter of metal particles resulting from pulverization by the first gas jet nozzle; and a third gas jet nozzle including a plurality of jet holes disposed in the bottom surface of the gas jet device in such a manner as to form a third ring on an outer side of the second gas jet nozzle, the third gas jet nozzle jetting gas against an inner wall surface of the spray chamber.

According to the aspects of the present invention, fine metal powder can be efficiently produced without any change in the shape of the spray chamber.

DESCRIPTION OF THE PREFERRED EMBODIMENT

An embodiment of the present invention will be described using the drawings.

Figure 1:
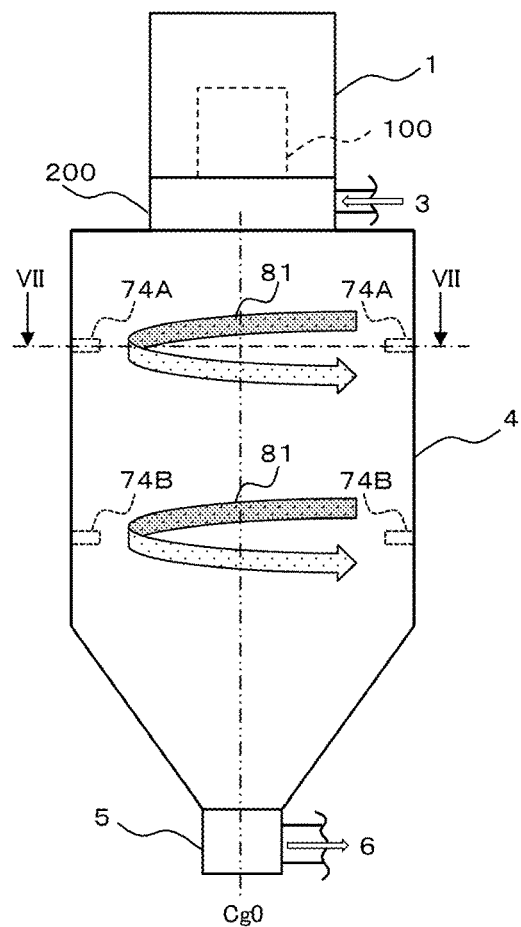
FIG. 1 is a diagram illustrating an overall configuration of a gas atomize apparatus used as a metal powder producing apparatus.

FIG. 1 is a diagram illustrating an overall configuration of a gas atomize apparatus used as a metal powder producing apparatus according to the present invention. The gas atomize apparatus in FIG. 1 includes: a melting chamber 1 housing a crucible (a tundish) 100, see FIG. 2, in which molten metal (liquid) which is liquid metal, is stored; a gas jet device 200 blowing a high-pressure gas (a gas fluid) against the liquid flowing down from the melting chamber 1 via a liquid nozzle, which is described below, 11 in form of fine particles to pulverize the liquid into a large number of particulates, and spraying the molten metal in form of a liquid; a jet gas feeding pipe (a jet flow feeding pipe) 3 through which the high-pressure gas is fed to the gas jet device 200; a spray chamber 4 which is a container held in an inert gas atmosphere and in which the particulate liquid metal sprayed from the gas jet device 200 is rapidly solidified while falling down; and a hopper 5 provided at a bottom portion of the spray chamber 4 to collect powdery solid metal resulting from solidification during fall-down in the spray chamber 4. The gas atomize apparatus uses the gas jet device 200 to jet the gas against the liquid flowing down from the liquid nozzle 11 to produce metal powder.

The inside of the melting chamber 1 is preferably held in an inert gas atmosphere. The spray chamber 4 is a container having, in an upper portion and a middle portion, a cylindrical shape with the same diameter, while having, in a lower portion, a taper shape with a diameter decreasing toward the hopper 5 for easy collection of metal powder in the hopper 5. The hopper 5 appropriately discharges an inert gas as exhaust 6.

Figure 2:
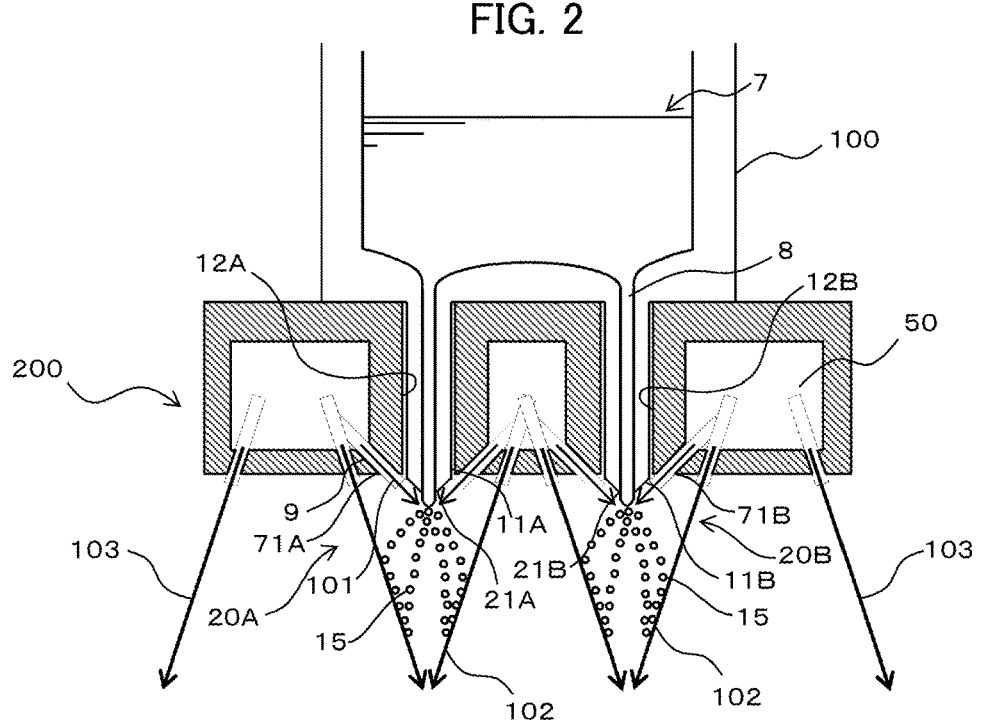
FIG. 2 is a cross-sectional view of periphery of a gas jet device 200.
Figure 3:
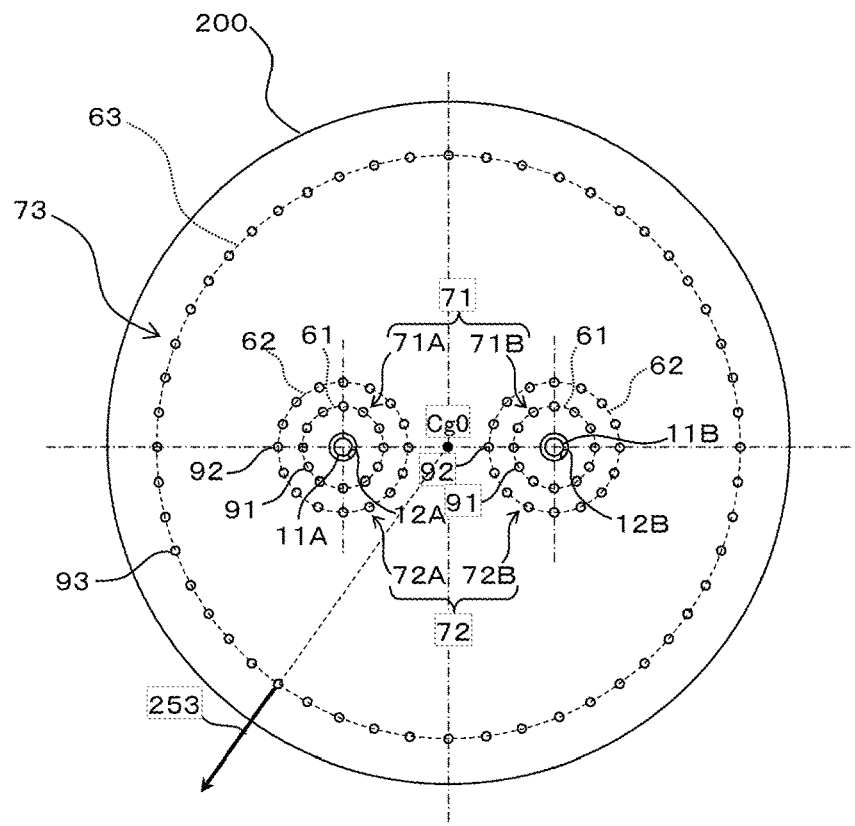
FIG. 3 is a bottom view of the gas jet device 200.
Figure 4:
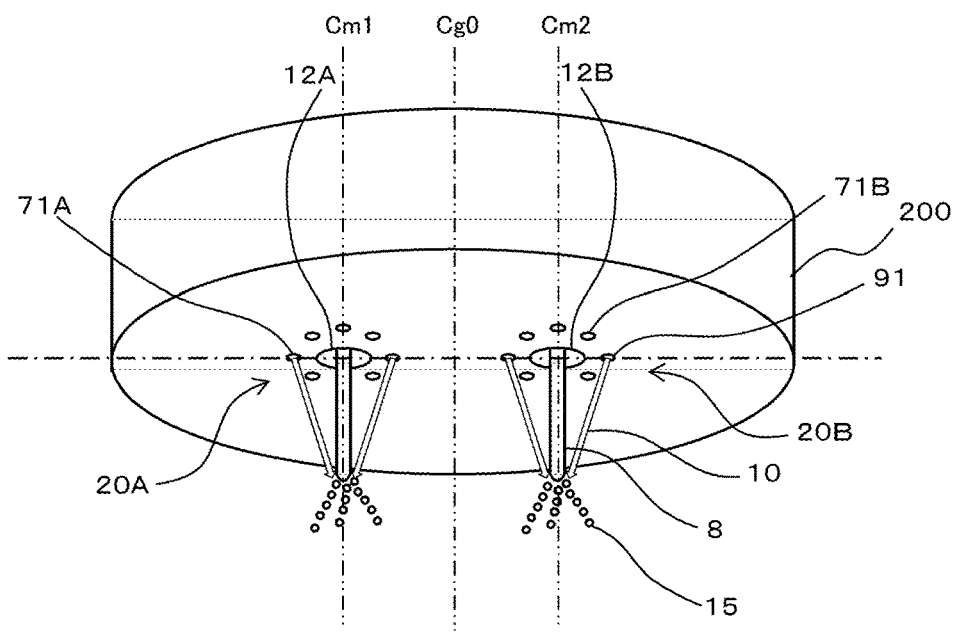
FIG. 4 is a perspective view of the gas jet device 200.

FIG. 2 is a cross-sectional view of periphery of the gas jet device 200 of the gas atomize apparatus according to the present embodiment. FIG. 3 is a bottom view of the gas jet device 200 according to the present embodiment. FIG. 4 is a perspective view of the gas jet device 200 according to the present embodiment. Note that, in FIG. 4, a plurality of jet holes (through-holes) 92 and 93 included in a second gas jet nozzle 72 and a third gas jet nozzle 73 illustrated in FIG. 3 are omitted.

Liquid Nozzles 11A and 11B

As illustrated in FIG. 2, a bottom portion of the crucible 100 in the melting chamber 1 is provided with liquid nozzles 11A and 11B which are a plurality of liquid nozzles causing molten metal in the crucible 100 to flow down into the spray chamber 4, the liquid nozzles 11A and 11B protruding downward from a bottom surface of the melting chamber 1 in the vertical direction. The two liquid nozzles 11A and 11B may have the same shape and include a vertically long hole which extends in the vertical direction and through which a liquid flows down. The vertically long hole forms a liquid channel through which the molten metal flows downward from the bottom portion of the crucible 100 in the vertical direction.

Opening ends 21A and 21B positioned at lower ends of the liquid nozzle 11A and the liquid nozzle 11B are each disposed to protrude from a bottom surface of the gas jet device 200 to face a cavity in the spray chamber 4. The molten metal in the crucible 100 flows down through the holes inside the liquid nozzles 11A and 11B in form of a liquid flow 8 and is discharged (flows down) into the spray chamber 4 via the opening ends 21A and 21B. For example, a value of 5 mm or less, which is smaller than that in the related art, can be selected as the minimum inner diameter of the first liquid nozzle 11A and the second liquid nozzle 11B contributing to the size of the diameter of the liquid flow 8 introduced into the spray chamber 4.

Gas Jet Device 200

As illustrated in FIG. 2, the gas jet device 200, having a generally cylindrical external form, includes a plurality of liquid nozzle insertion holes 12A and 12B into which the plurality of liquid nozzles 11A and 11B are inserted, and a first gas jet nozzle 71 jetting gas against the molten metal flowing down from the liquid nozzles 11A and 11B to pulverize the molten metal. The gas jet device 200 has an external shape of a cylinder of a hollow structure filled with an inert high-pressure gas, and internally includes a gas channel 50 forming a gas flow around each of the plurality of liquid nozzle insertion holes 12A and 12B. The gas channel 50 is fed with the high-pressure gas from a jet gas feeding pipe 3 connected to a gas suction hole, not illustrated, formed in a side surface of the cylinder of the gas jet device 200.

Additionally, the gas jet device 200 supports the crucible 100. Note that, although not illustrated, a heat insulating material is preferably interposed between the melting chamber 1 and the gas jet device 200 to prevent heat transfer from the melting chamber 1.

Liquid Nozzle Insertion Holes 12A and 12B

As illustrated in FIG. 4, the liquid nozzle insertion hole 12A and the liquid nozzle insertion hole 12B are two cylindrical through-holes including axes $Cm1$ and $Cm2$ parallel to a center axis $Cg0$ of the cylindrical gas jet device 200. The first liquid nozzle 11A and the second liquid nozzle 11B are respectively inserted into the first liquid nozzle insertion hole 12A and the second liquid nozzle insertion hole 12B. The center axes $Cm1$ and $Cm2$ of the first liquid nozzle insertion hole 12A and the second liquid nozzle insertion hole 12B may be respectively aligned with the center axes of the holes in the first liquid nozzle 11A and the second liquid nozzle 11B.

First Gas Jet Nozzle 71 Including 71A and 71B

The first gas jet nozzle 71 includes a plurality of jet holes (through-holes) 91 disposed in such a manner as to form first rings, see FIG. 3, 61 each around a corresponding one of the plurality of liquid nozzle insertion holes 12A and 12B. In this case, in the first gas jet nozzle 71, a gas jet nozzle including a plurality of jet holes 91 positioned around the liquid nozzle insertion hole 12A is referred to as a gas jet nozzle 71A, and a gas jet nozzle including a plurality of jet holes 91 positioned around the liquid nozzle insertion hole 12B is referred to as a gas jet nozzle 71B.

Figure 5:
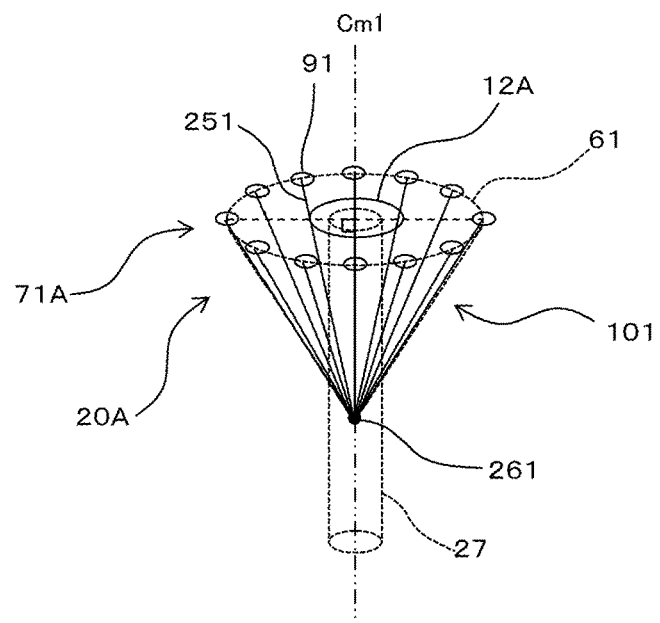
FIG. 5 is a diagram illustrating a relationship between gas jet directions of a plurality of jet holes 91 included in a gas jet nozzle 71A and a flow-down area 27 where a liquid from a first liquid nozzle 11a flows down.

FIG. 5 is a is a diagram illustrating a relationship between gas jet directions of the plurality of jet holes 91 included in the gas jet nozzle 71A and a flow-down area 27 where the liquid from the first liquid nozzle 11A flows down.

FIG. 5 illustrates, by straight lines 251, gas jet directions of the plurality of jet holes 91 included in the gas jet nozzle 71A. Each of the jet holes 91 is formed by drilling, in the bottom surface of the gas jet device 200, a through-hole with a center axis aligned with the corresponding straight line 251. The plurality of jet holes 91 are arranged in the bottom surface of the gas jet device 200 at regular intervals on the first ring 61, which is a circle concentric with the center axis Cm1 of the first liquid nozzle insertion hole 12A. The gas jet directions, which are illustrated by the straight lines 251, of all the jet holes 91 included in the gas jet nozzle 71A pass through a common focus (a first focus) 261. That is, the gas jet directions of all the jet holes 91 concentrate at one point (the focus 261). The focus 261 is positioned in a generally cylindrical flow-down area 27 defined by an outer diameter of the molten metal flowing down from the first liquid nozzle 11A, not illustrated in FIG. 4. A diameter of the flow-down area 27 can be appropriately adjusted according to the minimum inner diameter (an orifice diameter) of a hole included in the first liquid nozzle 11A. The diameter of the flow-down area 27 can be set to, for example, a value equal to or smaller than the diameter of the opening end 21A of the first liquid nozzle 11A. The gas jet nozzle 71B is formed similarly to the gas jet nozzle 71A, and descriptions of the gas jet nozzle 71B are omitted.

Note that the first ring 61 according to the present embodiment is a perfect circle the center of which corresponds to an intersection point between the center axis of each of the liquid nozzle insertion holes 12A and 12B and the bottom surface (the surface facing the inside of the spray chamber 4) of the gas jet device 200. In FIG. 3, the jet holes 91 included in the gas jet nozzle 71A are identical in number to the jet holes 91 included in the gas jet nozzle 71B. However, the number of the jet holes may vary between the gas jet nozzle 71A and the gas jet nozzle 71B.

Spray Nozzles 20A and 20B

The gas jet nozzle 71A and the liquid nozzle 11A are included in a first spray nozzle 20A spraying the molten metal into the spray chamber 4 in form of a liquid, and the gas jet nozzle 71B and the liquid nozzle 11B are similarly included in a second spray nozzle 20B. That is, the gas atomize apparatus according to the present embodiment includes two spray nozzles of the first spray nozzle 20A and the second spray nozzle 20B.

The gas jet device 200 according to the present embodiment includes a second gas jet nozzle 72 and a third gas jet nozzle 73 provided at the bottom surface of the gas jet device 200, and a fourth gas jet nozzle 74, see FIG. 1, provided at an inner wall surface of the spray chamber 4, in addition to the first gas jet nozzle 71 described above.

Second Gas Jet Nozzle 72 Including 72A and 72B

The second gas jet nozzle 72 is a gas jet nozzle including a plurality of jet holes (through-holes) 92 disposed in the bottom surface of the gas jet device 200 in such a manner as to form second rings 62 each on an outer side of a corresponding one of the two first rings 61. The second gas jet nozzle 72 jets gas to prevent scatter of metal particles resulting from pulverization by the first gas jet nozzle 71. The plurality of jet holes 92 are drilled in the bottom surface of the gas jet device 200. In this case, in the second gas jet nozzle 72, a gas jet nozzle including the plurality of jet holes 92 positioned around the liquid nozzle insertion hole 12A is referred to as a first gas jet nozzle 72A, and a gas jet nozzle including the plurality of jet holes 92 positioned around the liquid nozzle insertion hole 12B is referred to as a second gas jet nozzle 72B.

Figure 6:
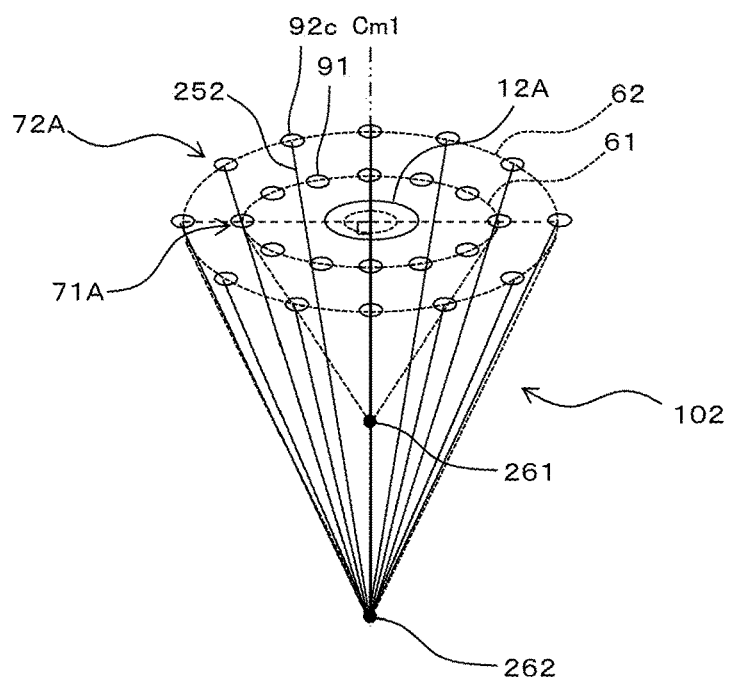
FIG. 6 is a diagram illustrating a relationship between gas jet directions of a plurality of jet holes 92 included in a gas jet nozzle 72A and a focus (a first focus) 261 of the gas jet nozzle 71A.

FIG. 6 is a diagram illustrating a relationship between gas jet directions of the plurality of jet holes 92 included in the gas jet nozzle 72A and the focus (the first focus) 261 of the gas jet nozzle 71A.

FIG. 6 illustrates, by straight lines 252, gas jet directions of the plurality of jet holes 92 included in the gas jet nozzle 72A. Each of the jet holes 92 is formed by drilling, in the bottom surface of the gas jet device 200, a through-hole with a center axis aligned with the corresponding straight line 252. The plurality of jet holes 92 are arranged in the bottom surface of the gas jet device 200 at regular intervals on the second ring 62, which is a circle concentric with the center axis Cm1 of the first liquid nozzle insertion hole 12A. The gas jet directions, which are illustrated by the straight lines 252, of all the jet holes 92 included in the gas jet nozzle 72A pass through a common focus (a second focus) 262. That is, the gas jet directions of all the jet holes 92 concentrate at one point (the focus 262). The focus (the second focus) 262 is positioned below the focus (the first focus) 261 of the gas jet nozzle 71A. The gas jet nozzle 72B is formed similarly to the gas jet nozzle 72A, and descriptions of the gas jet nozzle 72B are omitted.

Note that the second ring 62 according to the present embodiment is a perfect circle the center of which corresponds to an intersection point between the center axis of each of the liquid nozzle insertion holes 12A and 12B and the bottom surface (the surface facing the inside of the spray chamber 4) of the gas jet device 200 but that the second ring 62 may be an ellipse or a polygon and the center may be misaligned with the center axis of each of the liquid nozzle insertion holes 12A and 12B. However, the second ring 62 and the jet directions 252 of the plurality of jet holes 92 disposed on the second ring 62 need to be set such that the focus (the second focus) 262 of the jet holes 92 is positioned below the first focus 261. Additionally, in FIG. 3, the jet holes 92 included in the gas jet nozzle 72A are identical in number to the jet holes 92 included in the gas jet nozzle 72B. However, the number of the jet holes may vary between the gas jet nozzle 72A and the gas jet nozzle 72B. Additionally, in FIG. 6, the jet holes 92 included in the gas jet nozzle 72A are identical in number to the jet holes 91 included in the gas jet nozzle 71A. However, the number of the jet holes may vary between the gas jet nozzle 72A and the gas jet nozzle 71A.

Third Gas Jet Nozzle 73

The third gas jet nozzle 73 is a gas jet nozzle including a plurality of jet holes (through-holes) 93 disposed in the bottom surface of the gas jet device 200 in such a manner as to form a third ring 63 on an outer side of the second gas jet nozzle 72, which is disposed on the two second rings 62, and jetting gas against the inner wall surface of the spray chamber 4. The plurality of jet holes 93 are arranged in the bottom surface of the gas jet device 200 at regular intervals on the third ring 63 centered at a point through which the center axis Cg0 of the gas jet device 200 passes.

FIG. 2 and FIG. 3 illustrate, by an arrow 253, a gas jet direction of one of the jet holes 93 included in the gas jet nozzle 73. The gas jet direction (the straight line 253) of each jet hole 93 extends toward a closest portion of the inner wall surface of the spray chamber 4. Vectors resulting from projection of the gas jet directions 253 according to the present embodiment on the gas jet device 200 radially extend outward from the center, which is a point through which the center axis Cg0 of the gas jet device 200 passes on the bottom surface of the gas jet device 200, of the third ring 63. FIG. illustrates the gas jet direction 253 of one of the plurality of jet holes 93. Each of the jet holes 93 is formed by drilling, in the bottom surface of the gas jet device 200, a through-hole with a center axis aligned with the corresponding straight line 253.

Note that the third ring 63 according to the present embodiment is a perfect circle the center of which corresponds to the point through which the center axis Cg0 of the gas jet device 200 passes on the bottom surface of the gas jet device 200, but that the third ring 63 may be an ellipse or a polygon and the center may be misaligned with the center axis Cg0 of the gas jet device 200. However, the third ring 63 and the axial directions 253 of the jet holes 93 need to be set such that the gas jet direction of gas jetted from each jet hole 92 extends toward the inner wall surface of the spray chamber 4. Note that the number of the jet holes 93 illustrated in FIG. 3 is only an example and that any number can be selected to the extent that cooling performance of the spray chamber 4 is not degraded.

Fourth Gas Jet Nozzle 74 Including 74A and 74B

As illustrated in FIG. 1, the fourth gas jet nozzle 74 is a gas jet nozzle including a plurality of jet holes 94 disposed at a predetermined height in the spray chamber 4 and jetting gas along the inner wall surface of the spray chamber to generate, in the spray chamber 4, a swirling flow 81 around the center axis Cg0 of the spray chamber 4. In the present embodiment, as illustrated in FIG. 1, two gas jet nozzles 74A and 74B are provided at different installation heights in the spray chamber 4. In this case, in the fourth gas jet nozzle 74, a gas jet nozzle provided at a relatively high position in a height direction in the spray chamber 4 is referred to as a gas jet nozzle 74A, and a gas jet nozzle provided at a relatively low position in the height direction in the spray chamber 4 is referred to as a gas jet nozzle 74B.

Figure 7:
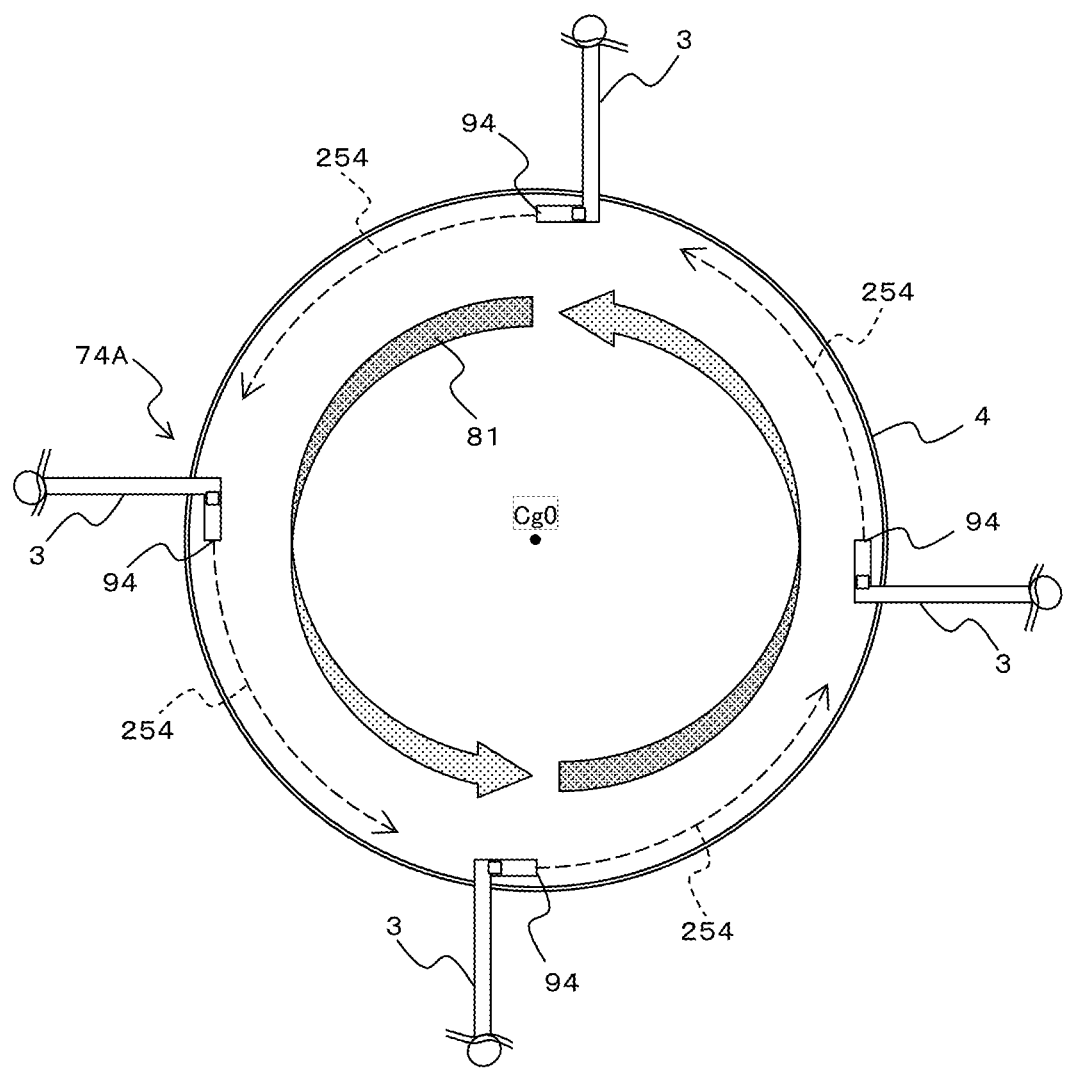
FIG. 7 is a cross-sectional view of a spray chamber 4 taken along line VII-VII in FIG. 1.

FIG. 7 is a cross-sectional view of the spray chamber 4 taken along line VII-VII in FIG. 1 and illustrating a configuration of the gas jet nozzle 74A and the jet holes 94 included in the gas jet nozzle 74A. FIG. 7 illustrates, by arrows 254, a flow of gas jetted from the plurality of jet holes included in the gas jet nozzle 74A. Each of the jet holes 94 is formed using a pipe with a center axis aligned with a tangential direction in an axial cross section of the inner wall surface of the spray chamber 4. As illustrated in FIG. 7, the plurality of jet holes 94 are arranged at regular intervals in a circumferential direction of an inner circumferential surface of the spray chamber 4. Each of the plurality of jet holes 94 is connected to the jet gas feeding pipe (the jet fluid feeding pipe) 3 and fed with a high-pressure gas from the jet gas feeding pipe 3. Note that, in the example in FIG. 7, the four jet holes 94 are disposed at intervals of 90 degrees on the same plane but that the number of the jet holes 94 may have any other value as long as the jet holes 94 enable the swirling flow 81 to be generated. Additionally, the gas jet nozzle 74B is formed similarly to the gas jet nozzle 74A, and descriptions of the gas jet nozzle 74B are omitted.

Operations and Effects (1) First Gas Jet Nozzle 71 Including Spray Nozzles 20A and 20B In the metal powder producing apparatus configured as described above, in a case where a high-pressure gas is fed through the jet gas feeding pipe 3 to the gas jet device 200, the high-pressure gas under the same pressure is jetted from all of the jet holes 91 included in the first gas jet nozzles 71A and 71B toward the inside of the spray chamber 4 in the gas jet device 200 while following jet directions, which are illustrated by the straight lines 251 as seen in FIG. 5, preset for the respective jet holes 91. At this time, in the first gas jet nozzles 71A and 71B, the gas is concentrically jetted onto the focus (the first focus) 261, forming fluid membranes 101 each having an inverted conical shape with a vertex corresponding to the focus 261 and a bottom surface corresponding to the circle (the ring) 61 on which the plurality of jet holes 91 are disposed as illustrated in FIG. 5. The fluid membranes 101 may be referred to as metal spraying gas jets (first gas jets) 101.

On the other hand, feeding molten metal into the melting chamber 1 causes two liquid flows 8 to flow down into the spray chamber 4 via the plurality of liquid nozzles 11A and 11B provided at the bottom surface of the melting chamber 1. Then, the liquid flows 8 collide with the metal spray gas jets 101 formed by the high-pressure gas near the two focuses 261 related to the first gas jet nozzles 71A and 71B and are pulverized into a large number of particulates 15.

In the present embodiment, a value, for example, 1 to 2 mm, smaller than a corresponding value, for example, approximately 5 mm, in the related art is selected as the minimum inner diameter of the holes included in the two liquid nozzles 11A and 11B. Thus, for example, even in a case where gas is jetted from the gas jet nozzles 71A and 71B under the same pressure as that in the related art, metal particles with a diameter smaller than that in the related art can be easily obtained. Additionally, in a case where the gas is jetted under the same pressure as that in the related art, an increase in the distance that the metal particles fly in the spray chamber 4 is prevented. This eliminates a need to replace the spray chamber 4 with one having a larger diameter or a need to enlarge an installation space in the spray chamber 4 in order to prevent the metal particles from being deformed. On the other hand, the minimum inner diameter smaller than that in the related art reduces the flow rate of the liquid flow 8 per unit time for each of the liquid nozzles 11A and 11B, leading to a reduced yield. However, in the present embodiment, the single spray chamber 4 includes the two liquid nozzles 11A and 11B, that is, the two spray nozzles 20A and 20B, enabling the yield per unit time to be doubled.

(2) Second Gas Jet Nozzle 72

Additionally, as is the case with the first gas jet nozzle 71, in a case where a high-pressure gas is fed through the jet gas feeding pipe 3 to the gas jet device 200, the high-pressure gas under the same pressure is jetted from all of the jet holes 92 included in the second gas jet nozzles 72A and 72B toward the inside of the spray chamber 4 in the gas jet device 200 while following jet directions, which are illustrated by the straight lines 252 as seen in FIG. 6, preset for the respective jet holes 92. At this time, in the second gas jet nozzles 72A and 72B, the gas is concentrically jetted onto the focus (the second focus) 262, forming fluid membranes 102 each having an inverted conical shape with a vertex corresponding to the focus 262 and a bottom surface corresponding to the circle (the ring) 62 on which the plurality of jet holes 92 are disposed as illustrated in FIG. 6. The fluid membranes 102 may be referred to as contact preventing gas jets (second gas jets) 102.

The contact preventing gas jets 102 formed by the second gas jet nozzles 72A and 72B function as air curtains preventing particulates 15, for example, molten metal flowing down from the liquid nozzle 11A, atomized from one of the two spray nozzles 20A and 20B from colliding with particulates 15, for example, molten metal flowing down from the liquid nozzle 11B, atomized from the other spray nozzle. As a result, this configuration prevents the metal particles from being deformed, allowing improvement of production efficiency for metal powder compared to a configuration provided only with the spray nozzles 20A and 20B.

Additionally, the metal powder producing apparatus according to the present embodiment includes the two spray nozzles 20A and 20B in the single spray chamber 4 and has a shorter distance from each of the spray nozzles 20A and 20B to the inner wall surface of the spray chamber 4 than metal powder producing apparatuses in the related art including only one spray nozzle 20. Thus, in the metal powder producing apparatus according to the present embodiment, unsolidified metal powder 15 is likely to collide with and adhere to the inner wall surface of the spray chamber 4. In this regard, the contact preventing gas jets (the second gas jets) 102 formed by the second gas jet nozzle 72 according to the present embodiment have generally conical shapes externally covering the metal spraying gas jets (the first gas jets) 101 and can thus inhibit the particulates 15 from scattering toward the inner wall surface of the spray chamber 4. That is, according to the present embodiment, this configuration also allows improvement of the production efficiency for metal powder. Additionally, for example, even in a case where the spray chamber 4 utilized has the same diameter as that in the related art, collision of the particulates 15 can be prevented, thus allowing prevention of an increase in the replacement cost of the spray chamber 4 and in the size of an installation space for the spray chamber 4.

Note that the particulates 15 into which the metal has been formed by the jet gas from the first gas jet nozzle 71 and which are inhibited by the jet gas from the second gas jet nozzle 72 from scattering in a radial direction of the spray chamber 4 are rapidly cooled and solidified while falling down through the spray chamber 4 and collected in the hopper 5 in form of a large number of grains of metal powder.

(3) Third Gas Jet Nozzle 73

Additionally, as is the case with the first and second gas jet nozzles 71 and 72, in a case where a high-pressure gas is fed through the jet gas feeding pipe 3 to the gas jet device 200, the high-pressure gas under the same pressure is jetted from all of the jet holes 93 included in the third gas jet nozzle 73 toward the inner wall of the spray chamber 4 in the gas jet device 200 while following jet directions, which are illustrated by straight lines 253 as seen in FIG. 3, preset for the respective jet holes 93. At this time, in the third gas jet nozzle 73, the gas is jetted from each jet hole to the closest portion of the inner wall surface of the spray chamber 4, forming a fluid membrane 103 having a generally truncated conical shape as illustrated in FIG. 2. The fluid membrane 103 may be referred to as a spray chamber cooling gas jet (a third gas jet) 103.

The spray chamber cooling gas jet 103 formed by the third gas jet nozzle 73 is discharged to the inner wall surface of the spray chamber 4 to cool the spray chamber 4. This facilitates sufficient cooling, in the spray chamber 4, of the particulates (the metal powder) 15 atomized by the spray nozzles 20A and 20B, and the particulates 15 are inhibited from sticking to and accumulating in the hopper 5 without being solidified in the spray chamber 4, leading to a reduced yield. Additionally, like the contact preventing gas jets 102, the spray chamber cooling gas jet 103 provides a function to prevent the particulates 15 from colliding with the inner wall surface of the spray chamber 4. That is, according to the present embodiment, this configuration also allows improvement of the production efficiency for metal powder.

(4) Fourth Gas Jet Nozzle 74

Additionally, feeding a high-pressure gas to the fourth gas jet nozzle 74 including 74A and 74B causes the high-pressure gas under the same pressure to be jetted from all of the jet holes 94 included in the fourth gas jet nozzle 74 along the inner wall of the spray chamber 4 while following jet directions, for example, the tangential direction of the inner wall of the spray chamber 4 in FIG. 7, preset for the respective jet holes 94. Thus, flows of the gas as indicated by the arrows 254 in FIG. 7 are generated in the spray chamber 4, and as a result, the swirling flow 81 along the inner wall of the spray chamber 4 is generated around the center axis of the spray chamber 4.

Similar to the second gas jet 102 and the third gas jet 103, the swirling flow 81 provides a function to prevent the particulates 15 from colliding with the inner wall surface. Additionally, the swirling flow 81 exerts an effect of uniformizing a heat distribution in a horizontal plane of the spray chamber 4, and thus allows the cooling performance of the spray chamber 4 to be improved in synergy with the third gas jet 103. That is, according to the present embodiment, this configuration also allows improvement of the production efficiency for metal powder.

As described above, with the metal spray apparatus according to the present embodiment including the second, third, and fourth gas jet nozzles 72, 73, and 74 in addition to the first gas jet nozzle 71, fine metal powder can be efficiently produced without any change in the shape of the spray chamber.

Other Configurations

The present invention is not limited to the above-described embodiment and includes various modifications without departing the spirits of the present invention. For example, the present invention is not limited to the configuration including all of the components described above in the embodiment but includes the configuration partly deleted. Additionally, a part of the configuration according to one embodiment can be added to or replace the configuration according to another embodiment.

For example, the gas channel 50 in the gas jet device 200 may be separated into portions corresponding to the respective gas jet nozzles 71 to 73, and may feed gas under different pressures to a plurality of gas channels into which the gas channel 50 has been separated, thus varying or adjusting the pressures of the gas jetted from the gas jet nozzles 71 to 73. Additionally, the gas jet nozzles 71 to 74 may have appropriately different diameters.

In the case described above in the embodiment, the second to fourth gas jet nozzles 72 to 74 are provided in addition to the first gas jet nozzle 71. However, even an embodiment including at least one of the second to fourth gas jet nozzles 72 to 74 may produce the effect of improving the production efficiency for metal powder.

The fourth gas jet nozzle 74 is configured to generate the swirling flow 81 counterclockwise in FIG. 7. However, the directions of the jet holes 94 may be changed to allow generation of a clockwise swirling flow 81. Additionally, the fourth gas jet nozzle 74 is provided at two positions in the height direction in the spray chamber 4. However, the fourth gas jet nozzle 74 may be provided at one or three or more positions.

In the case described above in the embodiment, the two spray nozzles 20A and 20B are provided for the single spray chamber. However, the number of the gas jet nozzles may be reduced to one or increased to three or more.

Additionally, in the case described above in the embodiment, gas, or gas fluid, is jetted from the gas jet nozzles 71 to 74. However, a liquid such as water may be jetted. That is, the present invention is applicable to any nozzles as long as the nozzle jets a fluid.

What is claimed is:

1. A metal powder producing apparatus comprising:
a spray chamber;
a plurality of liquid nozzles causing a molten metal stored in a crucible to flow down into the spray chamber;
a gas jet device provided with a plurality of liquid nozzle insertion holes into each of which respective of the plurality of liquid nozzles are inserted;
a first gas jet nozzle including a plurality of first jet holes disposed in a bottom surface of the gas jet device in such a manner as to form first rings each around a corresponding one of the plurality of liquid nozzle insertion holes, gas jet directions of all the first jet holes pass through a first focus, the first gas jet nozzle jetting gas against the molten metal flowing down through the liquid nozzles to pulverize the molten metal;

a second gas jet nozzle including a plurality of second jet holes disposed in the bottom surface of the gas jet device in such a manner as to form second rings each on an outer side of a corresponding one of the first rings, gas jet directions of all the second holes pass through a second focus that is positioned below the first focus, the second gas jet nozzle jetting gas to prevent scatter of metal particles resulting from pulverization by the first gas jet nozzle; and a third gas jet nozzle including a plurality of third jet holes disposed in the bottom surface of the gas jet device in such a manner as to form a third ring on an outer side of the second gas jet nozzle, axial directions of the third jet holes are set such that the gas jet direction of each third holes radially extends outward from a center of the third ring to a closest portion of an inner wall surface of the spray chamber, the third gas jet nozzle jetting gas against an inner wall surface of the spray chamber.

2. The metal powder producing apparatus according to claim 1, further comprising:

a fourth gas jet nozzle including a plurality of jet holes disposed at a predetermined height in the spray chamber, the fourth gas jet nozzle jetting gas along an inner wall surface of the spray chamber to generate, in the spray chamber, a swirling flow around a center axis of the spray chamber.

3. The metal powder producing apparatus according to claim 2, wherein a plurality of the fourth gas jet nozzles are provided in a height direction in the spray chamber.

4. A gas jet device for a metal powder producing apparatus producing metal powder by jetting gas on a liquid, the gas jet device comprising:

a plurality of liquid nozzle insertion holes into which liquid nozzles causing a molten metal to flow down into a spray chamber are inserted;

a first gas jet nozzle including a plurality of first jet holes disposed in such a manner as to form first rings each around a corresponding one of the plurality of liquid nozzle insertion holes, gas jet directions of all the first jet holes pass through a first focus, the first gas jet nozzle jetting gas against the molten metal flowing down from the liquid nozzles to pulverize the molten metal;

a second gas jet nozzle including a plurality of second jet holes disposed in such a manner as to form second rings each on an outer side of a corresponding one of the first rings, gas jet directions of all the second holes pass through a second focus that is positioned below the first focus, the second gas jet nozzle jetting gas to prevent scatter of metal particles resulting from pulverization by the first gas jet nozzle; and a third gas jet nozzle including a plurality of third jet holes disposed in such a manner as to form a third ring on an outer side of the second gas jet nozzle, axial directions of the third jet holes are set in such that the gas jet direction of each third holes radially extends outward from a center of the third ring to a closest portion of an inner wall surface of the spray chamber, the third gas jet nozzle jetting gas against an inner wall surface of the spray chamber.

* * * * *